(12) United States Patent
Ayambem et al.

(10) Patent No.: US 9,732,003 B2
(45) Date of Patent: Aug. 15, 2017

(54) NEUTRAL AQUEOUS WAX EMULSIONS

(71) Applicant: HENRY COMPANY LLC, El Sequndo, CA (US)

(72) Inventors: Amba Ayambem, Glenmoore, PA (US); Kate Sproul, Cherry Hill, NJ (US); Alex Gonzalez, Springfield, PA (US)

(73) Assignee: Henry Company LLC, El Segundo, CA (US)

( * ) Notice: Subject to any disclaimer, the term of this patent is extended or adjusted under 35 U.S.C. 154(b) by 0 days.

(21) Appl. No.: 15/294,901

(22) Filed: Oct. 17, 2016

(65) Prior Publication Data

US 2017/0029332 A1   Feb. 2, 2017

Related U.S. Application Data

(62) Division of application No. 14/293,650, filed on Jun. 2, 2014.

(60) Provisional application No. 61/830,515, filed on Jun. 3, 2013.

(51) Int. Cl.
| | |
|---|---|
| C04B 28/14 | (2006.01) |
| C08L 97/00 | (2006.01) |
| C08L 91/06 | (2006.01) |
| C08J 5/18 | (2006.01) |
| C04B 40/00 | (2006.01) |
| C04B 24/08 | (2006.01) |
| C04B 24/00 | (2006.01) |
| C04B 111/00 | (2006.01) |
| C04B 103/40 | (2006.01) |
| C04B 103/65 | (2006.01) |

(52) U.S. Cl.
CPC ............. C04B 28/14 (2013.01); C04B 24/00 (2013.01); C04B 24/08 (2013.01); C04B 40/0039 (2013.01); C08J 5/18 (2013.01); C08L 91/06 (2013.01); C08L 97/005 (2013.01); *C04B 2103/40* (2013.01); *C04B 2103/65* (2013.01); *C04B 2111/0062* (2013.01)

(58) Field of Classification Search
CPC ..... C04B 28/14; C04B 40/0039; C04B 24/08; C04B 24/00
See application file for complete search history.

(56) References Cited

U.S. PATENT DOCUMENTS

| | | | |
|---|---|---|---|
| 3,935,021 A | 1/1976 | Greve et al. | |
| 5,437,722 A | 8/1995 | Borenstein | |
| 2010/0116406 A1 | 5/2010 | Mahoney et al. | |
| 2010/0186870 A1* | 7/2010 | Stuart | C04B 28/14 156/39 |
| 2012/0216722 A1 | 8/2012 | Stuart et al. | |
| 2012/0263963 A1* | 10/2012 | Mahoney | C04B 28/14 428/484.1 |
| 2013/0042792 A1 | 2/2013 | Stuart et al. | |
| 2013/0047885 A1 | 2/2013 | Wantling et al. | |
| 2013/0053481 A1* | 2/20 | Romero-Nochebuena | C09D 135/06 524/73 |

* cited by examiner

*Primary Examiner* — John Uselding
(74) *Attorney, Agent, or Firm* — Baker & Hostetler LLP

(57) ABSTRACT

Wax emulsions for the manufacture of wallboard include water; a lignosulfonic acid or a salt thereof; and at least one wax selected from the group consisting of slack wax, paraffin wax and montan wax. The emulsions may have a pH of between about 6.5 and 7.9. Such emulsions can provide enhanced moisture resistance to the wallboard.

5 Claims, 1 Drawing Sheet

NEUTRAL AQUEOUS WAX EMULSIONS

CROSS REFERENCE TO RELATED APPLICATIONS

This application is a divisional application of application Ser. No. 14/293,650 filed Jun. 2, 2014 which is a National Stage Application filed under 35 U.S.C. 371 of International Application No. PCT/US2014/040559, filed Jun. 2, 2014, which claims benefit of U.S. Provisional Patent Application No. 61/830,515 filed Jun. 3, 2013, titled "NEUTRAL AQUEOUS WAX EMULSIONS," the entirety of which is incorporated herein by reference.

FIELD

This application relates generally to the formation of wax emulsions.

BACKGROUND

Wax emulsions have been used in composite wallboard (e.g., gypsum wallboard) for many years. For example, wax emulsions sold under the trade name AQUALITE® by Henry Company, and several wax emulsion formulations are disclosed in the prior art, such as U.S. Pat. No. 5,437,722, hereby incorporated by reference in its entirety.

Gypsum is employed in a gypsum panel or board product known as wallboard which is widely used as a structural building panel. Gypsum products are produced by mixing anhydrous calcium sulphate or calcium sulphate hemihydrate with water and allowing the mixture to hydrate or set as calcium sulphate dihydrate which is relatively hard. Gypsum wallboard comprises a panel-like core of set gypsum sandwiched between a pair of paper facers, or liners, which form the exposed outer surfaces of the wallboard. Fiberglass facers have also been used. In many applications wallboard is exposed to water. A problem with set gypsum is that it absorbs water, and such absorption reduces the strength of the wallboard.

U.S. Pat. No. 3,935,021, hereby incorporated by reference in its entirety, describes a gypsum wallboard in which polyvinyl alcohol and a wax-asphalt emulsion are incorporated in the gypsum core. In manufacturing wall board there are several properties needed to achieve acceptable products, including low edge swell and water absorption as well as strong internal bond strength and good flexural stiffness and flexural strength.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some embodiments, a wax emulsion, which may optionally be used for the manufacture of wallboard, is provided. The wax emulsion includes a lignosulfonic acid or a salt thereof, at least one wax selected from the group consisting of slack wax, montan wax, and paraffin wax, and a stabilizer.

In some embodiments, a wax emulsion, which may optionally be used for the manufacture of wallboard, is provided. The wax emulsion includes water, a base, a stabilizer, at least one wax selected from the group consisting of slack wax and montan wax, wherein the pH of the wax emulsion is between about 6.5 and 7.9, or about 7.2 and 7.9.

In some embodiments, a method for manufacturing wallboard is provided. The method comprises providing a wax emulsion comprising water, a lignosulfonic acid or a salt thereof, a stabilizer, and at least one wax selected from the group consisting of slack wax, montan wax, and paraffin wax. The wax emulsion comprises a pH of between about 6.5 and 7.9, or about 7.2 and 7.9. The method also comprises providing an aqueous slurry of a gypsum slurry. The method also comprises mixing the wax emulsion and the gypsum slurry to form a mixture.

Disclosed herein are embodiments of a wax emulsion for manufacture of wallboard, which can comprise water, a lignosulfonic acid or a salt thereof, at least one wax selected from the group consisting of slack wax, montan wax, and paraffin wax, and a stabilizer.

In some embodiments, the stabilizer can comprise at least one of polyvinyl alcohol and ethylene-vinyl alcohol-vinyl acetate terpolymer. In some embodiments, the wax emulsions can have a pH of between about 6.5 and about 7.9. In some embodiments, the wax emulsion can have a pH of between about 7.4 and about 7.7. In some embodiments, the solids content of the wax emulsion can be about 30% to about 60% by weight of the emulsion.

In some embodiments, the at least one wax can comprise slack wax. In some embodiments, the at least one wax can comprise slack wax and montan wax.

In some embodiments, the emulsion can comprise water in an amount of about 40% to about 70% by weight of the emulsion. In some embodiments, the emulsion can comprise a stabilizer in an amount of 0.1% to about 5% by weight of the emulsion. In some embodiments, the emulsion can comprise lignosulfonic acid or a salt thereof in an amount of about 0.1% to about 5% by weight of the emulsion. In some embodiments, the emulsion can comprise the at least one wax in an amount of about 40% to about 60% by weight of the emulsion.

In some embodiments, the wallboard can comprise gypsum. In some embodiments, the emulsion may not comprise an added base.

Also disclosed herein are embodiments of a wax emulsion for manufacture of wallboard which can comprise water, a base, a stabilizer, and at least one wax selected from the group consisting of slack wax and montan wax, and wherein the pH of the wax emulsion is between about 6.5 and 7.9.

In some embodiments, the stabilizer can comprise at least one of polyvinyl alcohol and ethylene-vinyl alcohol-vinyl acetate terpolymer. In some embodiments, the pH of the wax emulsion can be between about 7.4 and 7.7.

In some embodiments, the at least one wax can comprise slack wax. In some embodiments, the at least one wax can comprise montan wax and paraffin wax. In some embodiments, the slack wax can contain up to 20% oil by weight. In some embodiments, the wallboard can comprise gypsum. In some embodiments, the base can comprise a lignosulfonic acid or a salt thereof. In some embodiments, the emulsion may not comprise an added base.

Also disclosed herein is a method for manufacturing wallboard, the method can comprise providing a wax emulsion comprising water, a lignosulfonic acid or a salt thereof, a stabilizer, and at least one wax selected from the group consisting of slack wax, montan wax, and paraffin wax, the wax emulsion comprising a pH of between about 6.5 and 7.9, providing an aqueous slurry of a gypsum slurry, and mixing the wax emulsion and the gypsum slurry to form a mixture.

In some embodiments, the method can further comprise applying the mixture to a first sheet of wallboard facer. In some embodiments, the method can further comprise disposing a second sheet of wallboard facer on top of the mixture, so that the first and second sheets are in opposed facing relationship and have a layer of the mixture therebetween. In some embodiments, the method can further comprise performing press-in-place molding to the mixture.

In some embodiments, the stabilizer can comprise at least one of ethylene-vinyl alcohol-vinyl acetate terpolymer and polyvinyl alcohol. In some embodiments, the wax emulsion may not comprise an added base.

Figure 1:
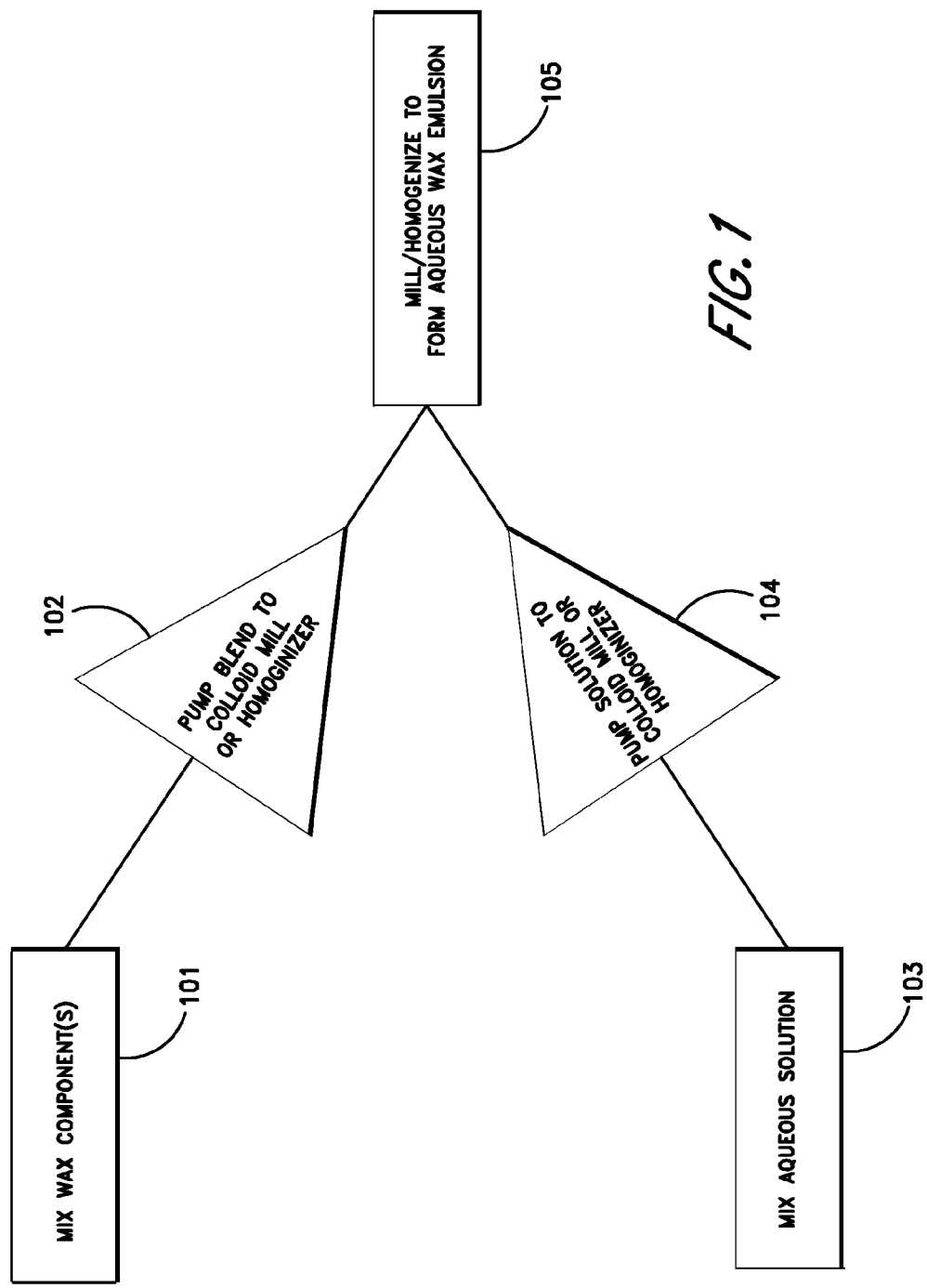
FIG. 1 illustrates an example process of an embodiment of the disclosure.

The disclosed aspects will hereinafter be described in conjunction with the appended drawings, provided to illustrate and not to limit the disclosed aspects, wherein like designations denote the elements.

DETAILED DESCRIPTION

Wax Emulsions Including Moisture Resistant Stabilizers

Embodiments of the improved wax emulsion described above are now described in greater detail, as follows. The wax emulsion comprises water, a lignosulfonic acid or salt thereof, one or more waxes selected from the group consisting of slack wax, montan wax, and paraffin wax, and a stabilizer, such as ethylene-vinyl alcohol-vinyl acetate terpolymer or polyvinyl alcohol. The wax emulsion may be used in the manufacture of composite wallboard. The terpolymer may enhance moisture resistance of the wallboard.

Water is preferably provided to the emulsion in amounts of about 30% to about 60% by weight of the emulsion, or about 40% to about 70% by weight of the emulsion. The solids content of the wax emulsion is preferably about 40% to about 70% by weight of the emulsion, or about 30% to about 60%. Other amounts may be used, and the amount is not limiting.

In some embodiments, a dispersant and/or a surfactant may be employed in the improved wax emulsions. Optional dispersants, include, but are not limited to those having a sulfur or a sulfur-containing group(s) in the compound such as sulfonic acids (R—S($=$O)2-OH) and their salts, wherein the R groups may be otherwise functionalized with hydroxyl, carboxyl or other useful bonding groups. In some embodiments, higher molecular weight sulfonic acid compounds such as lignosulfonic acid, naphthalene sulfonic acid, the sulfonate salts of these acids and derivatized or functionalized versions of these materials are used in addition or instead. An example lignosulfonic acid salt is Polyfon® H available from MeadWestvaco Corporation, Charleston, S.C. Other dispersants may be used, such as magnesium sulfate, polycarboxylate technology, ammonium hepta molybdate/starch combinations, non-ionic surfactants, ionic surfactants, zwitterionic surfactants and mixtures thereof, alkyl quaternary ammonium montmorillonite clay, etc. Similar materials may also be used herein, where such materials may be compatible with and perform well with the formulation components. For example, other materials may be used such that the edge swell, water absorption, internal bonding and flexural strength properties of the resultant boards are not materially affected and the resultant boards are acceptable for use as industry acceptable wallboard. If used, a dispersant and/or surfactant may comprise about 0.01% to about 5.0% by weight of the improved wax emulsion formulation composition, preferably about 0.1% to about 2.0% by weight of the improved wax emulsion formulation composition. Other concentrations may be used, and the concentrations are not limiting.

The wax component of the emulsion may include at least one wax which may be slack wax, montan wax and/or slack wax. The total wax content may be about 40% to about 60%, more preferably about 43% to about 55% by weight of the emulsion. Slack wax may be any suitable slack wax known or to be developed which incorporates a material that is a higher petroleum refining fraction of generally up to about 20% by weight oil. In addition to, or as an alternative to slack wax, paraffin waxes of a more refined fraction are also useful within the scope of the invention.

Suitable paraffin waxes may be any suitable paraffin wax, and preferably paraffins of melting points of from about 40° C. to about 110° C., although lower or higher melting points may be used if drying conditions are altered accordingly using any techniques known in the composite board manufacturing arts or otherwise. Thus, petroleum fraction waxes, either paraffin or microcrystalline, and which may be either in the form of varying levels of refined paraffins, or less refined slack wax may be used. Optionally, synthetic waxes such as ethylenic polymers or hydrocarbon types derived via Fischer-Tropsch synthesis may be included as well, however paraffins or slack waxes are preferred in certain embodiments.

Montan wax, which is also known in the art as lignite wax, is a hard, naturally occurring wax that is typically dark to amber in color (although lighter, more refined montan waxes are also commercially available). Montan is insoluble in water, but is soluble in solvents such as carbon tetrachloride, benzene and chloroform. In addition to naturally derived montan wax, alkyl acids and/or alkyl esters which are derived from high molecular weight fatty acids of synthetic or natural sources with chain lengths preferably of over 18 carbons, more preferably from 26 to 46 carbons that function in a manner similar to naturally derived montan wax are also within the scope of the invention and are included within the scope of "montan wax" as that term is used herein. Such alkyl acids are generally described as being of formula R—COOH, where R is an alkyl non-polar group which is lipophilic and can be from 18 to more than 200 carbons. An example of such a material is octacosanoic acid and its corresponding ester which is, for example, a di-ester of that acid with ethylene glycol. The COOH group forms hydrophilic polar salts in the presence of alkali metals such as sodium or potassium in the emulsion. While the alkyl portion of the molecule gets embedded within the paraffin, the acid portion is at the paraffin/aqueous medium interface, providing stability to the emulsion. Other components which may be added include esterified products of the alkyl acids with alcohols or glycols.

In some embodiments, the at least one wax component of the emulsion includes primarily and, preferably completely a slack wax component. In some embodiments, the at least one wax component is made up of a combination of paraffin wax and montan wax or of slack wax and montan wax. Although it should be understood that varying combinations of such waxes can be used. When using montan wax in combination with one or more of the other suitable wax components, it is preferred that montan be present in an amount of about 0.1% to about 10%, more preferably about 1% to about 4% by weight of the wax emulsion with the remaining wax or waxes present in amounts of from about 40% to about 50%, more preferably about 40% to about 45% by weight of the wax emulsion.

In some embodiments, the wax emulsion includes polyvinyl alcohol (PVOH) of any suitable grade which is at least partially hydrolyzed. The preferred polyvinyl alcohol is at least 80%, and more preferably at least 90%, and most preferably about 97-100% hydrolyzed polyvinyl acetate. Suitably, the polyvinyl alcohol is soluble in water at elevated temperatures of about 60° C. to about 95° C., but insoluble in cold water. The hydrolyzed polyvinyl alcohol is preferably included in the emulsion in an amount of up to about 5% by weight, preferably 0.1% to about 5% by weight of the emulsion, and most preferably about 2% to about 3% by weight of the wax emulsion.

In some embodiments, the stabilizer comprises a polymer that is at once capable of hydrogen bonding to the carboxylate or similar moieties at the water/paraffin interface, yet has reduced water solubility, such as cold water solubility, than either fully hydrolyzed polyvinyl alcohol or vinyl acetate-vinyl alcohol copolymer. Polymers that fit the hydrogen-bonding requirement would have such groups as hydroxyl, amine, and/or thiol, amongst others, along the polymer chain. Reducing the polymer's affinity for water (and thus, its water solubility) could be achieved by inserting hydrophobic groups such as alkyl, alkoxy silanes, or alkyl halide groups into the polymer chain. The result may be a polymer such as ethylene-vinyl acetate-vinyl alcohol terpolymer (where the vinyl acetate has been substantially hydrolyzed). The vinyl acetate content may be between 0% to 15%. In some embodiments, the vinyl acetate content is between 0% and 3% of the terpolymer chain. The ethylene-vinyl alcohol-vinyl acetate terpolymer may be included in the emulsion in an amount of up to about 10.0% by weight, preferably 0.1% to about 5.0% by weight of the emulsion. In some embodiments, ethylene-vinyl alcohol-vinyl acetate terpolymer may be included in the emulsion in an amount of about 2% to about 3% by weight of the wax emulsion. An example ethylene-vinyl alcohol-vinyl acetate terpolymer that is available is the Exceval AQ4104™, available from Kuraray Chemical Company.

The wax emulsion may include a stabilizer material (e.g., PVOH, ethylene-vinyl alcohol-vinyl acetate terpolymer as described above). The stabilizer may be soluble in water at elevated temperatures similar to those disclosed with reference to PVOH (e.g., about 60° C. up to about 95° C.), but insoluble in cold water. The active species in the wax component (e.g., montan wax) may be the carboxylic acids and esters, which may comprise as much as 90% of the wax. These chemical groups may be converted into carboxylate moieties upon hydrolysis in a high pH environment (e.g., in an environment including aqueous KOH). The carboxylate moieties may act as a hydrophilic portion or "head" of the molecule. The hydrophilic portions can directly interface with the surrounding aqueous environment, while the rest of the molecule, which may be a lipophilic portion or "tail", may be embedded in the wax. A stabilizer capable of hydrogen bonding to carboxylate moieties (e.g., PVOH or ethylene-vinyl alcohol-vinyl acetate terpolymer as described above) may be used in the wax emulsion. The polar nature of the carboxylate moiety may offer an optimal anchoring point for a stabilizer chain through hydrogen bonding. When stabilizer chains are firmly anchored to the carboxylate moieties as described above, the stabilizer may provide emulsion stabilization through steric hindrance. In embodiments where the wax emulsion is subsequently dispersed in a wallboard (e.g., gypsum board) system, all the water may be evaporated away during wallboard manufacture. The stabilizer may then function as a gate-keeper for repelling moisture. Decreasing the solubility of the stabilizer in water may improve the moisture resistance of the wax emulsion and the wallboard. For example, PVOH may only dissolve in heated, and not cool water. For another example, ethylene-vinyl alcohol-vinyl acetate terpolymer may be even less water soluble than PVOH. The ethylene repeating units may reduce the overall water solubility. Other stabilizer materials are also possible. For example polymers with hydrogen bonding capability such as those containing specific functional groups, such as alcohols, amines, and thiols, may also be used. For another example, vinyl alcohol-vinyl acetate-silyl ether terpolymer can be used. An example vinyl alcohol-vinyl acetate-silyl ether terpolymer is Exceval R-2015, available from Kuraray Chemical Company. In some embodiments, combinations of stabilizers are used.

In some embodiments, the wax emulsion can comprise a base. For example, the wax emulsion may comprise an alkali metal hydroxide, such as potassium hydroxide or other suitable metallic hydroxide, such as aluminum, barium, calcium, lithium, magnesium, sodium and/or zinc hydroxide. These materials may serve as saponifying agents. Other materials are also possible (e.g., ammonia hydroxide, alkyl metal hydroxide). Combinations of the above-mentioned materials are also possible. If included in the wax emulsion, potassium hydroxide is preferably present in an amount of 0% to 1%, more preferably about 0.1% to about 0.5% by weight of the wax emulsion.

In some embodiments, an exemplary wax emulsion comprises: about 30% to about 60% by weight of water; about 0.1% to about 5% by weight of a lignosulfonic acid or a salt thereof; about 0% to about 1% by weight of potassium hydroxide; about 40% to about 50% by weight of wax selected from the group consisting of paraffin wax, slack wax and combinations thereof; and about 0.1% to about 10% montan wax, and about 0.1 to 5% by weight of ethylene-vinyl alcohol-vinyl acetate terpolymer.

The wax emulsion may further include other additives, including without limitation additional emulsifiers and stabilizers typically used in wax emulsions, flame retardants, lignocellulosic preserving agents, fungicides, insecticides, biocides, waxes, sizing agents, fillers, binders, additional adhesives and/or catalysts. Such additives are preferably present in minor amounts and are provided in amounts which will not materially affect the resulting composite board properties. Preferably no more than 30% by weight, more preferably no more than 10%, and most preferably no more than 5% by weight of such additives are present in the wax emulsion.

The wax emulsion may be prepared using any acceptable techniques known in the art or to be developed for formulating wax emulsions, for example, the wax(es) are preferably heated to a molten state and blended together (if blending is required). A hot aqueous solution is prepared which includes any additives such as emulsifiers, stabilizers, etc., ethylene-vinyl alcohol-vinyl acetate terpolymer (if present), potassium hydroxide (if present) and lignosulfonic acid or any salt thereof. The wax is then metered together with the aqueous solution in appropriate proportions through a colloid mill or similar apparatus to form a wax emulsion, which may then be cooled to ambient conditions if desired. In some embodiments, the improved wax emulsion may be incorporated with or coated on various surfaces and substrates. For example, the improved wax emulsion may be mixed with gypsum to form a gypsum wallboard having improved moisture resistance properties.

For a general understanding of an example embodiment of the method of making the composition of the disclosure, reference is made to the flow diagram in FIG. 1. As shown in 101, first the wax components may be mixed in an appropriate device. Then, as shown in 102, the wax component mixture may be pumped to a colloid mill or homogenizer. As demonstrated in 103, in a separate step, water, and any emulsifiers, stabilizers, or additives (e.g., ethylene-vinyl alcohol-vinyl acetate terpolymer) are mixed. Then the aqueous solution is pumped into a colloid mill or homogenizer in 104. Steps 101 and 103 may be performed simultaneously, or they may be performed at different times. Steps 102 and 104 may be performed at the same time, so as to ensure proper formation of droplets in the emulsion. In some embodiments, steps 101 and 102 may be performed before step 103 is started. Finally, as shown in 105, the two mixtures from 102 and 104 are milled or homogenized to form an aqueous wax emulsion.

Some or all steps of the above method may be performed in open vessels. However, the homogenizer, if used, may use pressure in its application.

Advantageously in some embodiments, the emulsion, once formed, is cooled quickly. By cooling the emulsion quickly, agglomeration and coalescence of the wax particles may be avoided.

In some embodiments the wax mixture and the aqueous solution are combined in a pre-mix tank before they are pumped into the colloid mill or homogenizer. In other embodiments, the wax mixture and the aqueous solution may be combined for the first time in the colloid mill or homogenizer. When the wax mixture and the aqueous solution are combined in the colloid mill or homogenizer without first being combined in a pre-mix tank, the two mixtures may advantageously be combined under equivalent or nearly equivalent pressure or flow rate to ensure sufficient mixing.

In some embodiments, once melted, the wax emulsion is quickly combined with the aqueous solution. While not wishing to be bound by any theory, this expedited combination may beneficially prevent oxidation of the wax mixture.

Other uses for the improved wax emulsion may include use in building products such as engineered wood, oriented strand board, dust suppression in glass wool, packaging, and general waterproofing.

In preparing a gypsum wallboard using an example emulsion, an aqueous slurry of the gypsum material is prepared. In some embodiments, the aqueous slurry of gypsum material may comprise a stucco material that reacts with water to form a gypsum material. The aqueous emulsion is added to the slurry and mixed with the slurry (e.g., in proportions to provide about 0.5 parts by weight to about 20 parts by weight of the emulsion solids per 100 parts of gypsum). Such compositions may be varied. Other ingredients such as foaming agents, dispersants and set accelerators may be included in the slurry.

In preparing wallboard from such a settable gypsum formulation, the mixture of gypsum slurry and emulsions may be applied to a first sheet of wallboard facer to form a layer of the gypsum mixture thereon. A second sheet of facer may then be disposed on top of the deposited layer to form a structure in the manner of a wallboard assembly or in which the first and second sheets are in opposed, facing relationship and have the layer of the gypsum mixture therebetween. Alternatively, the gypsum slurry may be prepared directly into a facer-less wallboard structure using manufacturing methods involving press-in-place molding and similar techniques, such that reference to gypsum wallboard herein, is not restricted to liner-covered wallboard. However, it should be understood that other manufacturing techniques may be used, such as for example, manufacturing wallboard with glass mats on the exterior surfaces instead of standard facers.

The resulting structure or assembly may then be dried, such as by oven drying to remove excess water not needed for hydration of the gypsum, to leave finished gypsum wallboard. If liners are used, they may be formed of paper or may comprise fiberglass or organic fiber mats as well.

A settable gypsum composition is also described herein which includes a gypsum slurry and the wax emulsions described above. The aqueous wax emulsion preferably includes water; a wax component; a dispersant/surfactant (e.g., lignosulfonic acid); and a stabilizer (e.g., ethylene-vinyl alcohol-vinyl acetate terpolymer). An optional saponifying agent, preferably an alkali metal, may also be included.

Example 1

An experiment comparing the moisture resistance of gypsum wallboard made with a wax emulsion including PVOH as a stabilizer and the moisture resistance of a gypsum wallboard made with a wax emulsion including ethylene-vinyl alcohol-vinyl acetate terpolymer is performed. The wax emulsion in this example is made using the Exceval AQ4104 product. The formula of the wax emulsion is:

| Raw Materials | PVOH | Terpolymer |
| --- | --- | --- |
| Water | 58.14 | 58.14 |
| 45% KOH | 0.5 | 0.5 |
| PVOH Selvol 103 | 1.8 | — |
| Exceval AQ4104 | — | 1.8 |
| Polyphon H | 1.52 | 1.52 |
| Paraffin wax | 34.54 | 34.54 |
| Montan wax | 3.5 | 3.5 |

The formula of the gypsum wallboard into which the wax emulsion is incorporated is:

| Sample | PVOH | Terpolymer |
| --- | --- | --- |
| Stucco (g) | 720 | 720 |
| Accelerator (g) | 1.1 | 1.1 |
| Starch (g) | 2.15 | 2.15 |
| Water (g) | 720 | 720 |
| Emulsion (g) | 26.06 g | 26.06 g |
| Soap | 2.15 | 2.15 |
| ASTM C473 Moisture Resistance | 7.27% | 5.26% |
| Avg. Thickness | 0.5 | 0.5 |
| Length | 6 | 6 |
| Width | 6 | 6 |
| Density | 36.2 | 37.0 |
| Lb/msf | 1509.16 | 1540.26 |

A moisture resistance value of 7.27% was observed for the wallboard using the wax emulsion including PVOH as a stabilizer. In contrast, a moisture resistance value of about 5.26% was observed for the wallboard using the wax emulsion including ethylene-vinyl alcohol-vinyl acetate terpolymer as the stabilizer. The ethylene-vinyl alcohol-vinyl acetate terpolymer stabilizer exhibited a moisture resistance improvement of about 28% over the PVOH stabilizer.

Neutral Wax Emulsions

As noted above, when preparing aqueous wax emulsions, such as those disclosed herein, a base is commonly used. The active species in the wax component (e.g., montan wax) may be a mix of carboxylic acids and esters, which may comprise as much as 90% of the wax. A base can provide a high pH environment which can serve to ionize the acids and esters in the wax component, converting them to carboxylate moieties upon hydrolysis. The carboxylate moieties may then act as a hydrophilic portion of the molecule, which can interact with the surrounding aqueous environment. This portion of the wax component can serve as a bridge to connect the remainder of the wax component to the aqueous phase.

As described above, the base (e.g., potassium hydroxide) is traditionally used in wax emulsions as it is crucial in "activating" the wax component in the aqueous phase. Such agents can create a pH of around 12. The inventors of this application have recently found that the wax component is still activated when the base is left out of the wax emulsion. Without the saponifying agent, the wax emulsion has a near-neutral pH. For example, the pH of the wax emulsion may be between about 7 and 8. In some embodiments, the pH of the wax emulsion may be between about 7.2 and 7.9. In some embodiments, the pH of the wax emulsion may be between about 7.4 and about 7.7. In some embodiments, the pH of the wax emulsion may be between about 6.5 and about 7.9.

Without intending to be limited by theory, it is thought that other components of the wax emulsions may provide an environment with a pH sufficiently high to activate the wax component. For example, the dispersant (e.g., lignosulfonic acid salt) may provide a slightly basic environment for the wax emulsion. The slight basicity may be enough to enable the wax component to interact with the aqueous environment. Components other than the dispersant may also cause sufficient basicity to activate the wax component without creating a very basic environment.

Excluding the base (or substantially all of the base) from the wax emulsion may have other consequences to the properties of the emulsion. For example, removing the base (or substantially all of the base) may reduce the viscosity of the emulsion. Viscosity may have a significant effect on the moisture absorption properties of the emulsion. For example, within limits, increasing the viscosity of the emulsion can decrease moisture resistance of the emulsion; and decreasing the viscosity of the emulsion can increase moisture resistance of the emulsion.

A decreased viscosity can allow for or enable greater freedom in adjusting other components within the emulsion. For example, a decreased viscosity can allow for or enable the addition of extra components or more of the components present in the emulsion. In some embodiments, the amount of the stabilizer (e.g., PVOH, ethylene-vinyl alcohol-vinyl acetate terpolymer) may be increased. Increasing the amount of stabilizer may increase the moisture resistance properties of a wallboard containing the emulsion. As described in more detail above, the stabilizer may function as a gatekeeper for repelling moisture. Thus, decreasing the viscosity by removing the base can allow for adjustment and optimization of the emulsion formulation.

Example 2

An experiment comparing the viscosities of wax emulsions is performed. The wax emulsions tested include: 1.) a control emulsion including a base, KOH, and PVOH as the stabilizer; 2.) a control emulsion including a base, KOH, and ethylene-vinyl alcohol-vinyl acetate terpolymer as the stabilizer; 3.) a neutral emulsion containing PVOH as the stabilizer; 4.) a neutral emulsion containing the terpolymer as the stabilizer; 5.) a neutral emulsion with 150% of the amount of PVOH; and 6.) a neutral emulsion with 150% of the amount of terpolymer.

| Raw Materials | 1 | 2 | 3 | 4 | 5 | 6 |
|---|---|---|---|---|---|---|
| Water | 58.14 | 58.14 | 58.14 | 58.14 | 58.14 | 58.14 |
| 45% KOH | 0.5 | 0.5 | — | — | — | — |
| PVOH Selvol 103 | 1.8 | — | 1.8 | — | 2.7 | — |
| Exceval AQ4104 | — | 1.8 | — | 1.8 | — | 2.7 |
| Polyphon H | 1.52 | 1.52 | 1.52 | 1.52 | 1.52 | 1.52 |
| Paraffin wax | 34.54 | 34.54 | 34.54 | 34.54 | 34.54 | 34.54 |
| Montan wax | 3.5 | 3.5 | 3.5 | 3.5 | 3.5 | 3.5 |
| Viscosity | 130 | 130 | 130 | 130 | 130 | 130 |

As shown in the table above, the emulsions without the KOH, shown in columns 3 and 4, have a much lower viscosity, 40 cP, than the control emulsions, shown in columns 1 and 2 with a viscosity of 130 cP. Adding even more stabilizer to the emulsion, as done in the emulsions of columns 5 and 6 increases the viscosity to 92 cP, but still maintains a lower viscosity than the control emulsions.

Example 3

An experiment comparing the moisture resistance of gypsum wallboards incorporating: 1) a control emulsion with a base using PVOH as the stabilizer and 2.) a neutral emulsion using vinyl alcohol-vinyl acetate-silyl ether terpolymer as the stabilizer is performed. The wax emulsion content in each gypsum board formula was about 26.06 grams, the equivalent of 70 lbs./MSF. As shown in the table below, the neutral emulsion has a much lower viscosity of 56 cP compared to 128 cP. The moisture resistance of the wallboard incorporating the neutral emulsion with a silyl ether terpolymer stabilizer system was not as good as that of the control emulsion; at 5.50% compared to 5.01%.

| Emulsion Stabilizer | 1 Control | 2 Terpolymer |
|---|---|---|
| Stucco (g) | 720 | 720 |
| Accelerator (g) | 0.4 | 0.4 |
| Starch (g) | 2.15 | 2.15 |
| Water (g) | 720 | 720 |
| Wax Emulsion (g) | 26.06 | 26.06 |
| Emulsion Viscosity (cps) | 128 | 56 |
| Wax emulsion pH | 12 | 7.5 |
| Soap (g) | 2.15 | 2.15 |
| Initial Set | 5:18 | 5:05 |
| Wall board Lb/msf | 1557.53 | 1514.36 |
| ASTM C473 % Moisture Resistance | 5.01% | 5.50% |
| % MR Advantage vs. AQ70 | 0.0% | −9.8% |

Example 4

An experiment comparing the moisture resistance properties of gypsum wallboards incorporating: 1.) a control emulsion containing PVOH as the stabilizer and containing a base, 2.) a neutral emulsion using vinyl alcohol-vinyl acetate-ethylene terpolymer as the stabilizer at an identical amount to as the control emulsion, and 3.) a 150% neutral emulsion using vinyl alcohol-vinyl acetate-ethylene terpolymer as the stabilizer in an amount increased by 150%. The wax emulsion content in each gypsum board is about 20.48 grams, the equivalent of 55 lbs/MSF. As shown in the table below, the control emulsion has the highest viscosity of 128 cP; the terpolymer emulsion has the lowest viscosity of 56 cP; and the wax emulsion made with 150% of terpolymer has an intermediate viscosity of 80 cP. The wallboard containing the wax emulsion made with 150% terpolymer is the most moisture resistant, with 4.77% moisture resistance. The wallboard containing terpolymer emulsion has a moisture resistance of 5.61%. The wallboard containing the control emulsion has a moisture resistance of 6.46%.

| Emulsion Stabilizer | 1 Control | 2 Terpolymer | 3 150% Terpolymer |
|---|---|---|---|
| Stucco (g) | 720 | 720 | 720 |
| Accelerator (g) | 0.4 | 0.4 | 0.4 |
| Starch (g) | 2.15 | 2.15 | 2.15 |
| Water (g) | 720 | 720 | 720 |
| Wax Emulsion (g) | 20.48 | 20.48 | 20.48 |
| Emulsion Viscosity (cps) | 128 | 56 | 80 |
| Soap (g) | 2.15 | 2.15 | 2.15 |
| Initial Set | 5:23 | 5:26 | 5:29 |
| Wall board Lb/msf | 1598.85 | 1635.42 | 1577.27 |
| ASTM C473 % Moisture resistance (MR) | 6.46% | 5.61% | 4.77% |
| % MR Advantage vs. AQ70 | 0.0% | 13.2% | 26.2% |

Example 5

An experiment comparing the moisture resistance of gypsum wallboards containing 1.) a control emulsion including a base and using PVOH as the stabilizer with 2.) a neutral emulsion containing 150% of the amount of PVOH as the control is performed. The wax emulsion content in each gypsum board formula was about 18.61 grams, the equivalent of 50 lbs/MSF. As shown in the table below, the control emulsion has a viscosity of 128 cP while the neutral emulsion has a viscosity of 92 cP. The moisture resistance of the terpolymer emulsion is 4.95%, while the moisture resistance of the control emulsion if 6.68%.

| Emulsion Stabilizer | 1 Control | 2 150% Neutral |
|---|---|---|
| Stucco (g) | 720 | 720 |
| Accelerator (g) | 0.4 | 0.4 |
| Starch (g) | 2.15 | 2.15 |
| Water (g) | 720 | 720 |
| Wax Emulsion (g) | 18.61 gr | 18.61 gr |
| Emulsion Viscosity (cps) | 128 | 92 |
| Soap (g) | 2.15 | 2.15 |
| Wall board Lb/msf | 1590.22 | 1545.64 |
| ASTM C473 % Moisture resistance (MR) | 6.68% | 4.95% |
| % MR Advantage vs. AQ70 | 0.00% | 26.0% |

From the foregoing description, it will be appreciated that inventive devices and approaches for neutral aqueous wax emulsions have been disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using and medical applications for the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A method for manufacturing wallboard, the method comprising:
   providing a wax emulsion comprising water, a lignosulfonic acid or a salt thereof, a stabilizer consisting essentially of an ethylene-vinly alcohol-vinyl acetate terpolymer, and at least one wax selected from the group consisting of slack wax, and paraffin wax, the wax emulsion comprising a pH of between about 6.5 and 7.9;
   providing an aqueous slurry of a gypsum slurry; and
   mixing the wax emulsion and the gypsum slurry to form a mixture.

2. The method of claim 1, further comprising applying the mixture to a first sheet of wallboard facer.

3. The method of claim 1, further comprising disposing a second sheet of wallboard facer on top of the mixture, so that the first and second sheets are in opposed facing relationship and have a layer of the mixture therebetween.

4. The method of claim 1, further comprising performing press-in-place molding to the mixture.

5. The method of claim 1, wherein the wax emulsion does not comprise an added base.

\* \* \* \* \*